United States Patent
Südow et al.

(10) Patent No.: US 9,874,647 B2
(45) Date of Patent: Jan. 23, 2018

(54) DISTRIBUTED MULTI-SENSOR STREAMER

(71) Applicant: PGS Geophysical AS, Oslo (NO)

(72) Inventors: Mattias Südow, Houston, TX (US); Geir Andre Motzfeldt Drange, Borgen (NO); Øyvind Hillesund, Nesbru (NO)

(73) Assignee: PGS Geophysical AS, Oslo (NO)

( * ) Notice: Subject to any disclaimer, the term of this patent is extended or adjusted under 35 U.S.C. 154(b) by 343 days.

(21) Appl. No.: 14/317,622

(22) Filed: Jun. 27, 2014

(65) Prior Publication Data

US 2015/0063063 A1 Mar. 5, 2015

Related U.S. Application Data

(60) Provisional application No. 61/873,223, filed on Sep. 3, 2013.

(51) Int. Cl.
*G01V 1/38* (2006.01)
*G01V 1/20* (2006.01)

(52) U.S. Cl.
CPC ............. *G01V 1/201* (2013.01); *G01V 1/20* (2013.01); *G01V 1/3826* (2013.01); *G01V 1/38* (2013.01)

(58) Field of Classification Search
CPC ........ G01V 1/201; G01V 1/38; G01V 1/3826; G01V 1/20
USPC ................................. 367/16–18, 20
See application file for complete search history.

(56) References Cited

U.S. PATENT DOCUMENTS

| | | | |
|---|---|---|---|
| 3,996,553 A * | 12/1976 | Siems | G01V 1/38 340/870.41 |
| 4,618,949 A * | 10/1986 | Lister | G01V 1/16 310/15 |
| 6,932,017 B1 | 8/2005 | Hillesund et al. | |
| 7,080,607 B2 | 7/2006 | Hillesund et al. | |
| 7,162,967 B2 | 1/2007 | Hillesund et al. | |
| 7,222,579 B2 | 5/2007 | Hillesund et al. | |
| 7,684,281 B2 | 3/2010 | Vaage et al. | |
| 8,136,383 B2 | 3/2012 | Goujon et al. | |
| 8,553,490 B2 | 10/2013 | Hillesund et al. | |
| 9,001,617 B2 * | 4/2015 | Storteig | G01V 1/201 367/15 |
| 9,322,942 B2 * | 4/2016 | Mellier | G01V 1/00 |
| 2001/0035311 A1 | 11/2001 | He et al. | |
| 2005/0194201 A1 * | 9/2005 | Tenghamn | G01V 1/201 181/112 |
| 2006/0133202 A1 * | 6/2006 | Tenghamn | G01V 1/38 367/24 |

(Continued)

FOREIGN PATENT DOCUMENTS

| | | |
|---|---|---|
| GB | 2392495 | 3/2004 |
| GB | 2411723 | 9/2005 |

OTHER PUBLICATIONS

Extended European Search Report in Application No. 14183045.5 dated Jul. 4, 2016, 8 pages.

*Primary Examiner* — Ian J Lobo

(57) ABSTRACT

This disclosure is related to the field of streamers. In one embodiment, a streamer may include a group of particle motion sensors. In some embodiments, at least two of the particle motion sensors in the group are movable relative to one another within the streamer, and the two particle motion sensors are configured to measure motion along a particular axis. In some embodiments, the streamer may additionally include a plurality of pressure sensors.

18 Claims, 5 Drawing Sheets

(56) References Cited

U.S. PATENT DOCUMENTS

| | | | |
|---|---|---|---|
| 2008/0025146 A1* | 1/2008 | Welker | G01V 1/3835 |
| | | | 367/20 |
| 2008/0089174 A1* | 4/2008 | Sollner | G01V 1/3808 |
| | | | 367/21 |
| 2008/0253225 A1 | 10/2008 | Welker et al. | |
| 2009/0065289 A1* | 3/2009 | Tenghamn | G01V 1/184 |
| | | | 181/112 |
| 2009/0122641 A1* | 5/2009 | Hillesund | G01V 1/3808 |
| | | | 367/20 |
| 2010/0202249 A1 | 8/2010 | Goujon et al. | |
| 2011/0310698 A1 | 12/2011 | Maples et al. | |
| 2011/0317514 A1 | 12/2011 | Sudow et al. | |
| 2012/0269033 A1 | 10/2012 | Maples et al. | |
| 2013/0064038 A1 | 3/2013 | Maples et al. | |
| 2015/0016217 A1 | 1/2015 | Hillesund et al. | |

\* cited by examiner

DISTRIBUTED MULTI-SENSOR STREAMER

CROSS-REFERENCE TO RELATED APPLICATIONS

This application claims the benefit of Provisional Patent Application No. 61/873,223 filed Sep. 3, 2013, which is incorporated by reference herein in its entirety.

BACKGROUND

This application generally relates to the field of marine geophysical prospecting. More specifically, the application relates to the field of streamer design.

In the oil and gas exploration industry, marine geophysical prospecting is commonly used in the search for hydrocarbon-bearing subterranean formations. Marine geophysical prospecting techniques may yield knowledge of the subsurface structure of the Earth, which is useful for finding and extracting hydrocarbon deposits such as oil and natural gas. Seismic surveying is one of the well-known techniques of marine geophysical prospecting.

For example, in a seismic survey conducted in a marine environment (which may include saltwater, freshwater, and/or brackish water environments), one or more seismic energy sources are typically configured to be submerged and towed by a vessel. The vessel is typically also configured to tow one or more laterally-spaced streamers through the water. At selected times, control equipment may cause the one or more seismic energy sources to actuate. Seismic signals may then be received by sensors disposed along the streamers. Data collected during such a seismic survey may be analyzed to assist identification of hydrocarbon-bearing geological structures, and thus determine where deposits of oil and natural gas may be located.

DETAILED DESCRIPTION

Figure 1:
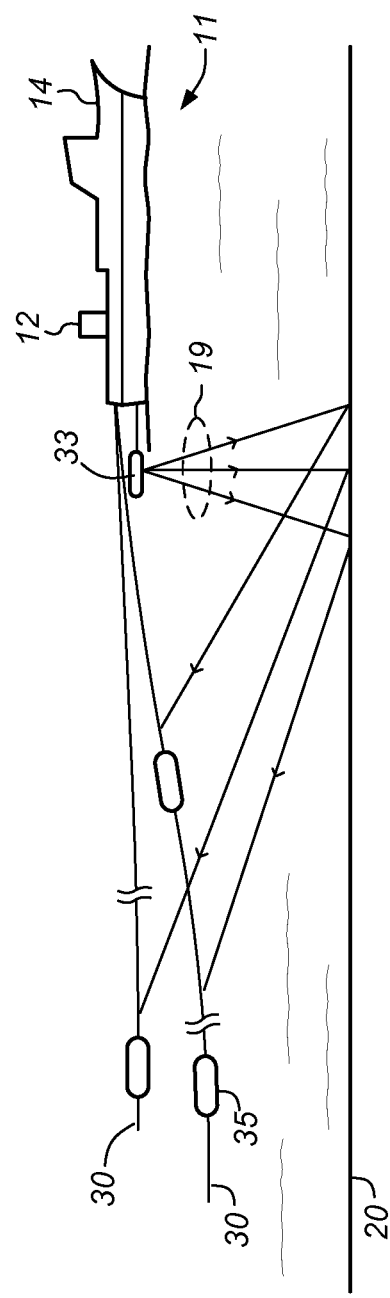
FIG. 1 illustrates a marine seismic survey system using an apparatus according to one embodiment of the disclosure.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This specification may use phrase such as "based on." As used herein, this term is used to describe one or more factors that affect a determination. This term does not foreclose additional factors that may affect a determination. That is, a determination may be solely based on those factors or based only in part on those factors. Consider the phrase "determine A based on B." This phrase connotes that B is a factor that affects the determination of A, but does not foreclose the determination of A from also being based on C. In other instances, A may be determined based solely on B.

Various devices, units, circuits, or other components may be described or claimed as "configured to" perform a task or tasks. In such contexts, "configured to" is each used to connote structure by indicating that the devices/units/circuits/components include structure that performs the task or tasks during operation. As such, the device/unit/circuit/component can be said to be configured to perform the task even when the specified device/unit/circuit/component is not currently operational (e.g., is not on or in operation). The devices/units/circuits/components used with the "configured to" language include hardware—for example, circuits, memory storing program instructions executable to implement the operation, etc. Reciting that a device/unit/circuit/component is "configured to" perform one or more tasks is expressly intended not to invoke 35 U.S.C. §112(f), for that device/unit/circuit/component.

In some embodiments, various items of information relating to geophysical surveying may be embodied in a geophysical data product. A "geophysical data product" may be stored on a computer-readable, non-transitory medium and may embody geophysical data (such as raw streamer data, processed streamer data, two- or three-dimensional maps based on streamer data, etc.). Some non-limiting examples of computer-readable media may include hard drives, CDs, DVDs, print-outs, etc. In some embodiments, raw analog data from streamers may be stored as a geophysical data product. In other instances, the data may first be digitized and/or conditioned prior to being stored as the geophysical data product. In yet other instances, the data may be fully processed into a two- or three-dimensional map of the various geophysical structures before being stored in the geophysical data product. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the geophysical data product.

A marine seismic survey commonly employs seismic energy sources such as an array of air guns or marine vibrators that produce a seismic wavefield when activated. As used herein, a "seismic wavefield" includes components such as a single velocity field with vertical and lateral variations. In a marine seismic survey, the seismic wavefield typically travels downward through a body of water overlying the subsurface of the earth. Upon propagating into the Earth, the seismic wavefield is then at least partially reflected by subsurface reflectors. Such reflectors are typically those interfaces between subterranean formations having different elastic properties such as density and sound wave velocity, which may lead to differences in acoustic impedance at the interfaces. The reflected seismic wavefield is detected by the sensors such as particle motion sensors and/or pressure sensors in the streamers. A record is made in the recording system of the signals detected by each sensor (or by groups/networks of such sensors). The recorded signals may thereafter be interpreted to infer properties of the subterranean formation.

Streamers may be quite long, typically multiple kilometers in length. Some geophysical surveys may be conducted with a single streamer, while some surveys use multiple streamer systems including one or more arrays of streamers. The individual streamers in such arrays may be generally affected by the same types of forces that affect a single streamer.

One of the most common types of pressure sensor used in marine seismic surveying is a hydrophone. A hydrophone may typically be an omnidirectional device. Such hydrophones therefore generally cannot distinguish between the directions of the up-going and down-going wavefields. In particular, seismic energy directly reaching the hydrophones from the source cannot be easily distinguished from the various reflections from the surface of the water and the seafloor (e.g., the "source ghost" and the "receiver ghost"). As a consequence, wavefields of both the source and receiver ghost may interfere with primary reflections, which contain the desired information about the subterranean formations, reducing seismic image resolution and reducing the usefulness of seismic data for reservoir delineation and characterization.

Due to the omnidirectional reception nature of hydrophones, particle motion sensors have also been employed to detect vector quantities during marine seismic survey operations. The term "particle motion sensor" should be understood in the context of this disclosure as referring to any of various types of sensors, including velocity meters, accelerometers, geophones, pressure gradient sensors, particle displacement sensors, etc.

In a multi-component streamer that includes both pressure sensors and particle motion sensors, the combination of signals from pressure and particle motion sensors may be used to remove the "ghosting" effects during seismic data processing. One example of this is described in U.S. Pat. No. 7,684,281, which is incorporated herein by reference in its entirety.

Streamer positioning devices (e.g., lateral force and depth control devices commonly known as "birds") are in some embodiments coupled to the exteriors of the streamers in the array. The streamer positioning devices are operable to impart force on the streamers to control the respective positions of the streamers in the array.

Turning now to FIG. 1, an embodiment of a marine seismic survey system is shown. Vessel 14 may move along a surface of body of water 11 such as a lake or the ocean. Vessel 14 may include source actuation, data recording, and navigation equipment, shown generally at 12 and referred to for convenience in the aggregate as a "recording system." Vessel 14 (or a different vessel, not shown) may be configured to tow one or more seismic energy sources 33, or one or more arrays of such sources, in body of water 11. Vessel 14 (or a different vessel) may also tow one or more streamers 30 near the surface of body of water 11. Streamers 30 may include a plurality of streamer positioning devices 35. Streamers 30 may in some embodiments contain various types of sensors (e.g., hydrophones, geophones, pressure sensors, particle motion sensors, etc.), one or more strength members, electrical wiring (e.g., data and/or power wiring), optical fiber, and other components. Although not shown, it is contemplated that streamers 30 may also include electromagnetic sensors, and that additional streamers may be utilized at varying depths.

In accordance with some embodiments, streamer 30 may be a multi-component streamer, containing both particle motion sensors and pressure sensors. Pressure sensors may be configured to detect a scalar-valued wavefield, and particle motion sensors may be configured to detect a vector-valued wavefield. The configuration of some embodiments of streamer 30 will be explained in more detail below.

During one embodiment of marine seismic survey operation, seismic energy source 33 may actuate at selected times. When actuated, seismic energy source 33 may produce seismic wavefield 19 that emanates generally outwardly from seismic energy source 33. Seismic wavefield 19 may travel downwardly, through body of water 11, and pass, at least in part, through water bottom 20 into the subterranean formations. Seismic wavefield 19 may be at least partially reflected from one or more acoustic impedance boundaries below water bottom 20, and may travel upwardly and be detected by sensors in streamers 30. The structure of the formations, among other properties of the Earth's subsurface, may be inferred by detection of seismic wavefield 19 and by characteristics of the detected seismic wavefield, such as amplitude, phase, travel time, etc.

The orientation, configuration, and number of streamers, sensors, streamer positioning devices, or other equipment shown in FIG. 1 is only for purposes of illustration and is not a limitation on the orientation, configuration, or number of each device that may be used in any particular embodiment. The broken lines in streamers 30 indicate that this figure is not necessarily drawn to scale Turning now to FIG. 2, a schematic of a sensor configuration of one embodiment of streamer 30 is shown. Sensors may be combined into groups, for example, to increase sensitivity and/or improve the signal-to-noise ratio. In the embodiment shown in FIG. 2, streamer 30 includes particle motion sensor groups 500, 510, 520, and 530, as well as pressure sensor groups 400, 410, 420, and 430. In this embodiment, particle motion sensor group 500 may include a plurality of particle motion sensors 50A, 50B, 50C, and 50D ("50A-50D") that are electrically connected to form particle motion sensor group 500. Particle motion sensors 50A-50D may in some embodiments be 1-, 2-, or 3-axis sensors configured to measure one or more vector components of particle motion in the body of water 11.

Figure 2:
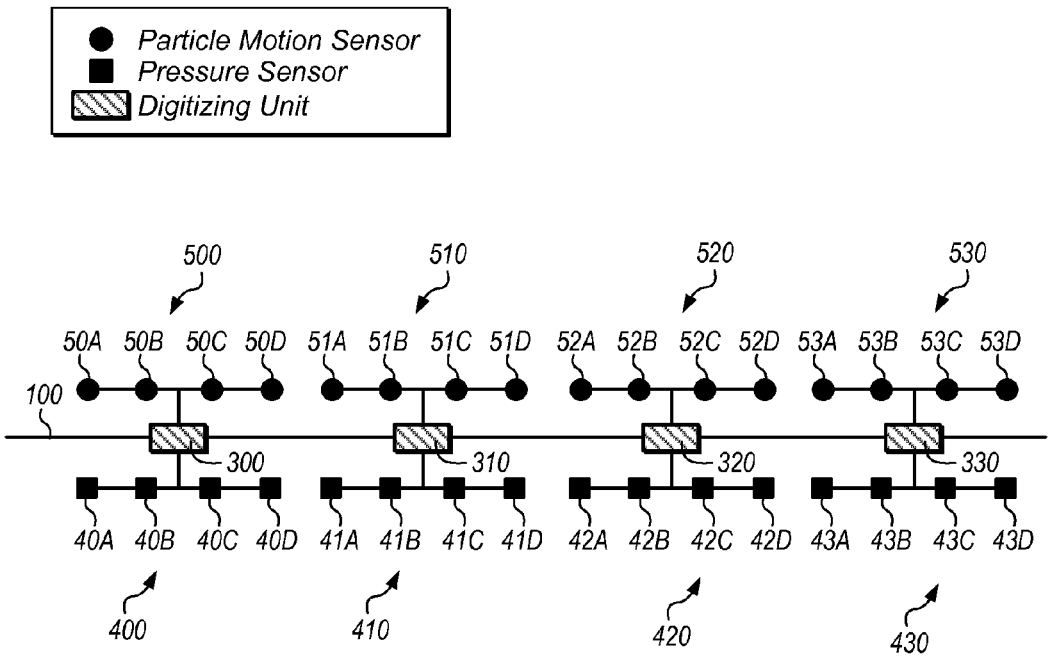
FIG. 2 illustrates an embodiment of a configuration of a group of particle motion sensors and a group of pressure sensors in an apparatus according to the disclosure.

The term "sensor group," as used herein, is defined as a set of two or more sensors (e.g., particle motion sensors or pressure sensors) that are connected together such that the outputs of the sensors are combined in an analog fashion. In some embodiments, a sensor group may span a length of 5 meters along a streamer. In some other embodiments, a sensor group may span a length of 10 meters along a streamer. For example, sensors within a group may be connected electrically or optically in some embodiments. In some embodiments, this combined analog output from a sensor group may then be digitized for further processing. Sensors within a group may in various embodiments be connected in serial and/or in parallel. FIG. 2 illustrates an example configuration in which particle motion sensor groups 500, 510, 520, and 530 include both series and parallel connections. That is (for example), particle motion sensors 50A and 50B are connected in series, and particle motion sensors 50C and 50D are connected in series, and the two pairs are then connected in parallel. One of ordinary skill in the art with the benefit of this disclosure will of course understand that there are various ways of connecting the sensor outputs in each group.

In known designs, it has been considered desirable for all of the sensors within a sensor group to be rigidly connected together (e.g., disposed within a single rigid body in the streamer). Such a rigid arrangement may have the advantage of simplifying processing of the resultant data, but it may have the disadvantage of limiting the flexibility that would be available if sensors within a group could be mounted non-rigidly relative to one another. According to embodiments of the present disclosure, sensors within a single group may be mounted non-rigidly to one another.

The number of sensors in a group may be selected as appropriate in various instances. For example, a group may include 2, 3, 6, 12, 16, 24, 32, or any other appropriate number of sensors.

Particle motion sensor group 500 may be coupled to digitizing unit 300. Digitizing unit 300 may be configured to process the combined signals of particle motion sensors 50A-50D. For example, in some embodiments, digitizing unit 300 may include an analog to digital conversion circuitry that is configured to digitize the combined signals of particle motion sensors 50A-50D. Digitizing unit 300 may in some embodiments also be configured to perform some additional processing on the signals from particle motion sensors 50A-50D. For example, digitizing unit 300 may be configured to determine a particular component (e.g., vertical) of motion based on the signal from particle motion sensors 50A-50D.

In some embodiments, digitizing unit 300 may be configured to process a summed signal of particle motion sensor group 500. In these embodiments, signals from particle motion sensors 50A-50D in particle motion sensor group 500 may be summed to generate the equivalent of a single particle motion sensor signal.

In some embodiments, digitizing unit 300 may include a module or circuitry to attenuate noise in a summed signal of particle motion sensor group 500 by respectively weighting signals of each of particle motion sensors 50A-50D and determining a weighted signal. For example, in an electrical system, the weights may be determined by selecting appropriate values for resistors used to connect each particle motion sensor to the others in the group. In one embodiment, the spacing between each adjacent particle motion sensor 50A-50D and the weight of each of particle motion sensor may be selected to attenuate noise in a selected mode of propagation and within a selected wavenumber range. Some embodiments of connections between sensors in a group involving weighting are described in U.S. Pat. No. 8,553, 490, which is incorporated herein by reference in its entirety.

As shown in FIG. 2, output from digitizing unit 300 may be communicatively coupled to telemetry network 100 and transmitted to recording system 12 (onboard vessel 14 in FIG. 1) for data analysis and/or further processing.

Similar to particle motion sensor group 500, particle motion sensor groups 510, 520, and 530 may each respectively contain particle motion sensors 51A, 51B, 51C, and 51D; 52A, 52B, 52C, and 52D; and 53A, 53B, 53C, and 53D. Each of these groups may also respectively be coupled to digitizing units 310, 320, and 330.

In known designs, the particle motion sensors within a group are typically rigidly connected together so that their orientation relative to one another remains constant. For example, a gimbal may be used in known designs to maintain a sensor in a desired orientation (e.g., vertical). These known designs may have the advantage of simplifying data collection and processing, but they may lack flexibility in sensor placement. The particle motion sensors in a particle motion sensor group need not be rigidly connected together, and thus individual sensors within a group may be moved relative to one another by, for example, water currents, streamer twisting, streamer untwisting, forces applied by birds, etc. Such motion may occur during survey operations, such as during the time in between survey shots or even (though typically to a lesser extent) during a single shot. For example, the individual sensors may be independently rotatable with respect to an axis (such as the streamer axis). They may also in some embodiments be movable longitudinally relative to one another along the streamer axis or movable based on streamer bending, although it is expected that these effects will typically be smaller than rotational effects.

Such an arrangement may allow for more flexibility in the positioning of sensors within a group. Various challenges may be introduced by not rigidly connecting together all sensors in a group. As described herein, these challenges may be mitigated or eliminated with the benefit of this disclosure.

In some embodiments, particular ones of the sensors within a group may be mounted rigidly together, while other ones are free to move. For example, particle motion sensors 50A and 50B may be rigidly mounted together, and particle motion sensors 50C and 50D may be rigidly mounted together, but the pairs may be free to move relative to one another. In other embodiments, all of the sensors within a group may be free to move relative to one another.

In one embodiment, for example, the particle motion sensors in a group may be disposed (e.g., mounted) in two or more rigid bodies. These rigid bodies, however, may be movable with respect to one another. In an alternative embodiment, the particle motion sensors in a group may be disposed within a single non-rigid (e.g., bendable) body.

In one embodiment, particle motion sensors 50A-50D may be disposed within streamer 30 and arranged such that they are longitudinally spaced apart from each other along a length of streamer 30. In a particular embodiment, a distance between particle motion sensors 50A and 50B may be less than or equal to 1 meter. Particle motion sensors 50A-50D in particle motion sensor group 500 may or may not be evenly spaced apart. Distance is generally measured from a center of an item, for example, a body such as a spacer which may house a sensor, to a center of another item (e.g., another body such as another spacer housing another sensor). The term "spacer" is understood to mean a solid structural component within a streamer that connects to the strength members. The term "body" includes spacers, but also includes various other solid structures within a streamer to which sensors may be mounted. The mechanical arrangement of particle motions sensors 50A-50D within a streamer will be discussed in further detail below in reference to FIG. 4.

In some embodiments, digitizing unit 300 may be disposed within 5 meters of particle motion sensor group 500. The respective distance between particle motion sensor group 510, 520, and 530 and respective digitizing units 310, 320, or 330 may or may not be the same. Streamer 30 may contain multiple such particle motion sensor groups and digitizing units.

As shown in FIG. 2, streamer 30 may also in some embodiments include pressure sensor groups 400, 410, 420, and 430, which may include individual pressure sensors that are connected together. Pressure sensors 40A-40D may be, for example, hydrophones. Pressure sensors 40A-40D may be disposed within streamer 30 and be arranged longitudinally spaced apart from each other along a length of the streamer 30. Similarly, pressure sensor groups 410, 420, and 430 may respectively include pressure sensors 41A, 41B, 41C, and 41D; 42A, 42B, 42C, and 42D; and 43A, 43B, 43C, and 43D.

Pressure sensor group 400 may be configured to produce an electrical or optical signal indicative of a pressure variation. Digitizing unit 300 may be configured to process output of pressure sensor group 400 and such output may be transmitted to recording system 12 via telemetry network 100. In some embodiments, a separate digitizing unit (not shown) may be used instead of digitizing unit 300.

In some embodiments, the pressure sensors need not be arranged into groups. Instead, a digitizing unit may be configured to process the output of an individual pressure sensor. In some embodiments, the pressure sensors may even be omitted altogether. The digitized output of the pressure sensors (if present) may similarly be transmitted to recording system 12 via telemetry network 100.

Figure 3:
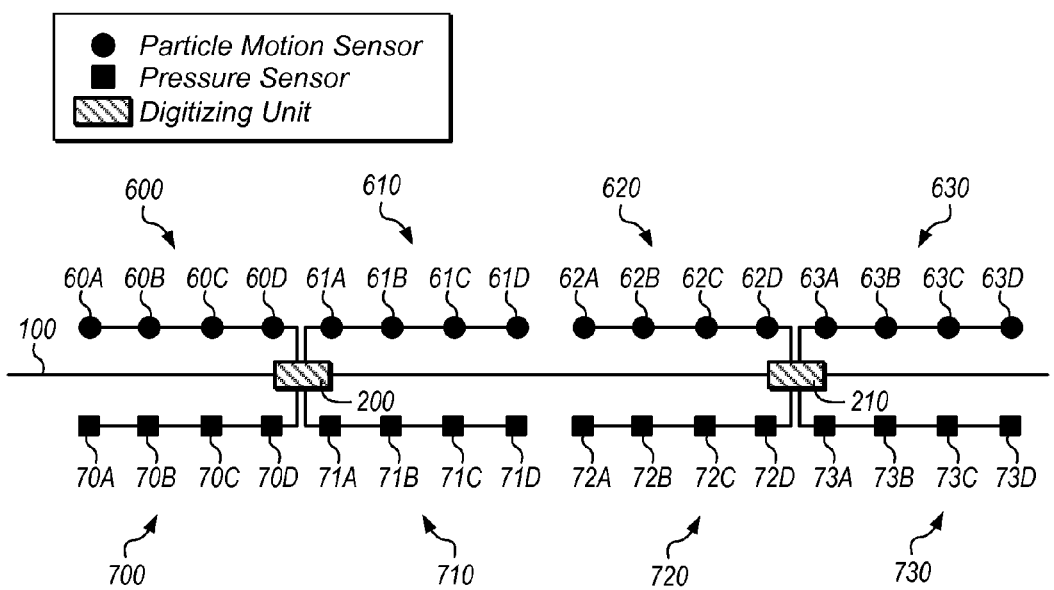
FIG. 3 illustrates an alternative embodiment of a configuration of a group of particle motion sensors and a group of pressure sensors in an apparatus according to the disclosure.

Turning now to FIG. 3, an alternative embodiment (generally similar to that of FIG. 2) is shown. In FIG. 3, a different configuration for the sensors is depicted. Particle motion sensor groups 600 and 610 respectively include particle motion sensors 60A, 60B, 60C, and 60D connected in series; and 61A, 61B, 61C, and 61D connected in series. Digitizing unit 200 may be configured to process signals from both particle motion sensor groups 600 and 610. In addition, digitizing unit 200 may be configured to process signals from pressure sensor groups 700 and 710. The remainder of FIG. 3 may be understood by reference to corresponding structures in FIG. 2. One of ordinary skill in the art with the benefit of this disclosure will understand the multitude of ways that sensors may be connected together in various instances.

Figure 4:
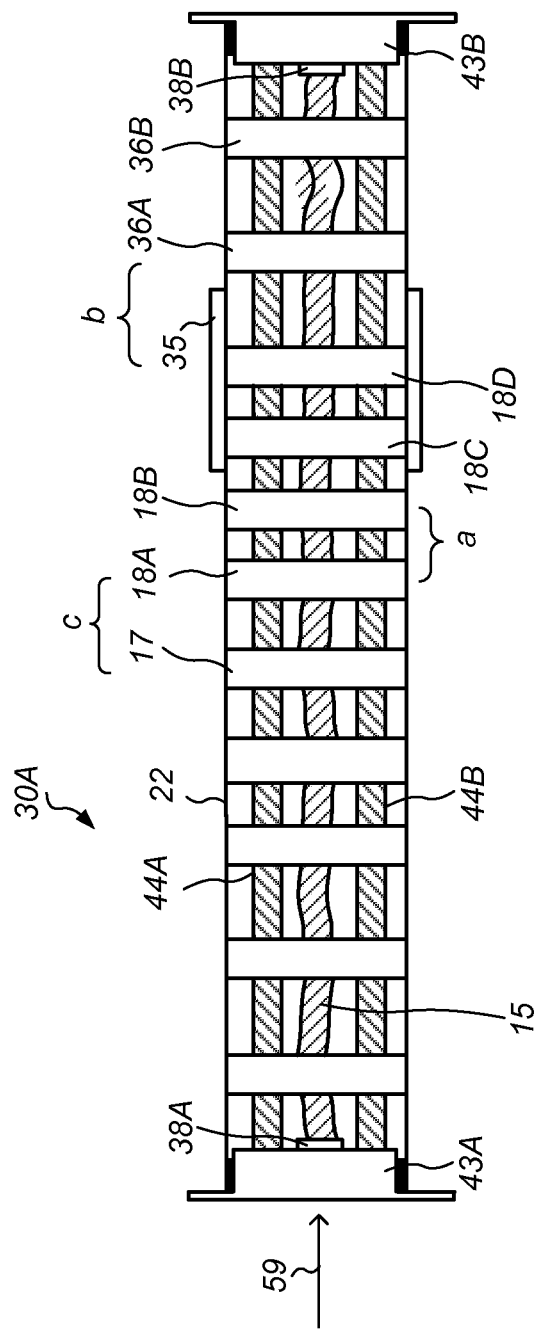
FIG. 4 illustrates a cut-away view of an embodiment of an apparatus of the disclosure.

Turning now to FIG. 4, a cut-away view of a portion 30A of streamer 30 is shown (not necessarily to scale). Streamer portion 30A may include external jacket 22, a plurality of bodies including bodies 18A, 18B, 18C, and 18D ("18A-18D"), along with connectors 38A and 38B, and strength members 44A and 44B. In this particular embodiment, streamer portion 30A may also include coupling plates 43A and 43B.

External jacket 22 may be formed from a flexible, acoustically transparent material such as polyurethane and protect the interior of streamer portion 30A from water intrusion. Connectors 38A and 38B may be disposed at the ends of streamer portion 30A and may be configured to connect streamer portion 30A mechanically, electrically, and/or optically to the remaining portions of streamer 30. Also included in streamer portion 30A is cable 15 that may include one or more electrical conductors (not shown separately), and/or one or more optical fibers (not shown). Cable 15 may include telemetry network 100 (shown schematically in FIGS. 2 and 3) and may transmit electrical and/or optical signals to recording system 12. Cable 15 may also carry electrical power to, for example, various sensors, digitizing units, and/or other components disposed elsewhere along streamer 30.

Strength members 44A and 44B may be configured to support the tension of streamer 30 resulting from towing (as shown in FIG. 1) in the direction of longitudinal axis 59.

As noted above, in some embodiments, bodies 18A-18D may be spacers that are configured to provide radial support of streamer portion 30A. Such spacers may be of a cylindrical or other shape. The spacers may be made from plastic, foamed polyurethane or any other suitable material. In some embodiments, the spacers may be made from a material configured to provide buoyancy to streamer portion 30A. In yet an alternative embodiment, one or more of the bodies may be a housing that is flexible or bendable.

In the embodiment illustrated in FIG. 4, body 18A may house particle motion sensor 50A. In some embodiments, particle motion sensor 50A may be rigidly disposed within body 18A. In other embodiments, other types of suitable devices such as harnesses and others may be used to mount particle motion sensor 50A and/or other sensors within body 18A. In the illustration of FIG. 4, each of bodies 18A-18D is coupled to strength members 44A and 44B. Particle motion sensors 50A-50D of particle motion sensor group 500 may each be rigidly disposed within corresponding bodies 18A-18D. As such, each of particle motion sensors 50A-50D may not be movable relative to the corresponding body in which it is housed. However, as streamer portion 30A may twist, compress, or otherwise move during towing, bodies 18A-18D may also move or twist relative to on another. Accordingly, particle motion sensors 50A-50D may also move or twist relative to one another.

Bodies 18A-18D may in some embodiments also contain one or more pressure sensors. In other embodiments, such pressure sensors may instead be housed in separate bodies (not specifically labeled in FIG. 4). For example, a pressure sensor (or group of pressure sensors) may in some embodiments be located within 10 meters of a corresponding group of particle motion sensors.

As noted above, the movement and/or twisting of bodies 18A-18D relative to one another may cause particle motion sensors 50A-50D (e.g., some or all of such particle motion sensors) to become misaligned relative to one another. As used herein, the term "misaligned" (or variations of the term) means an arrangement of at least two items where the orientation of the items differs by more than 3°. The term "aligned" (or variations of the term) means an arrangement of at least two items where the orientation of the items differs by less than or equal to 3°. In some embodiments, it may be desirable for the items to be aligned even more closely than 3°. For example, it may be advantageous for the items to be aligned to within 2.5°, 2°, 1.5°, 1°, 0.5°, 0.1°, etc. in various embodiments.

In one particular embodiment, bodies 18A-18D are evenly spaced at distance "a" along the length of streamer portion 30A, and distance "a" is approximately 0.5 meters. In this embodiment, bodies 18A-18D thus extend for a length of approximately 1.5 meters along the length of streamer portion 30A, and particle motion group 500 which includes particle motion sensors 50A-50D extends for the same approximate length of approximately 1.5 meters along streamer portion 30A. In an alternative embodiment, bodies 18A-18D may be variably spaced. In other embodiments, the length of the particle motion sensor group may be approximately 3 meters or even longer. Other lengths may also be chosen as appropriate.

Streamer portion 30A may also include bodies 36A and 36B, which may be coupled to strength members 44A and 44B. In this embodiment, particle motion sensors 51A and 51B may be rigidly disposed within body 36A, whereas particle motion sensors 51C and 51D may be rigidly disposed within body 36B. Particle motion sensor group 510 is accordingly disposed within bodies 36A and 36B. In certain embodiments, particle motion sensor groups 500 and 510 may be separated by distance "b" which may be in an approximate range of 1-15 meters along the length of streamer portion 30A. Particle motion sensor groups such as groups 500, 510, 520 and 530 (shown in FIGS. 2 and 3) may or may not be evenly spaced apart along the length of streamer 30.

In one embodiment, particle motion sensors 50A-50D in particle motion sensor group 500 may be generally oriented along one or more axes (e.g., two axes) orthogonal to longitudinal axis 59 (for example, vertical and horizontal axes). For example, particle motion sensors 50A-50B may be oriented along one axis that is orthogonal to longitudinal axis 59, and particle motion sensors 50C-50D may be oriented a different (e.g., mutually orthogonal) axis. In other words, particle motion sensor group 500 may include two subgroups of sensors that are both oriented orthogonal to longitudinal axis 59 and that are also oriented orthogonal to one another. Such subgroups may contain one or more particle motion sensors.

In some embodiments, streamer portion 30A may contain body 17 in which a tilt sensor (also referred to as an orientation sensor) may be disposed. For example, a single tilt sensor may be used to determine the twist orientation of the body in which the sensor is mounted. In other instances, multiple tilt sensors may be used to determine a twist rate along a selected length of the streamer or streamer portion. As described below, the twist orientation and/or the twist rate may be used to mitigate the effects of sensor misalignment.

Body 17 may be disposed within distance "c" from particle motion sensor group 500. Distance "c" may, in some embodiments, be approximately 1 to 2 meters. In other embodiments, distance "c" may be within a range of approximately 1 to 5 meters of particle motion sensor group 500. In some embodiments, the tilt sensor may be disposed within one of the same bodies as an element of particle motion sensor group 500. The tilt sensor may include an accelerometer sensor, a gyroscopic sensor, a magnetic sensor, a combination thereof, or any other suitable device for indicating a tilt state. In one embodiment, the tilt sensor may be of a particular orientation relative to one of particle motion sensors in particle motion sensor group 500. In this embodiment, the particular orientation of the tilt sensor relative to at least one particle motion sensor in particle motion sensor group 500 may be known prior to the commencement of the marine seismic survey operations. Based on such a known orientation, the tilt sensor may be configured to indicate a change in orientation such as a tilt angle of the at least one particle motion sensor in particle motion sensor group 500.

A tilt sensor (which may also generally be referred to as an "orientation sensor") may indicate a misalignment of a particle motion sensor relative to other particle motion sensors in particle motion sensor group 500. Misalignment may be indicative of twisting of streamer portion 30A. While tilt sensors are typically used to indicate a rotational relationship relative to a particular axis, in some embodiments, more than one tilt sensor may be spatially separated by a selected length along the streamer axis in order to estimate the amount of twist in the streamer. In some embodiments, the tilt sensor(s) may be in signal communication with streamer positioning device 35, and upon an indication of twisting of streamer portion 30A, streamer positioning device 35 may accordingly untwist the streamer portion 30A.

As shown in this embodiment, streamer positioning device 35 may be coupled to exterior jacket 22 of streamer portion 30A. In other embodiments, streamer positioning device 35 may be coupled in between streamer portions such as those that may be connected by way of connector 38A or 38B. Typically, such streamer positioning device may be coupled to streamer 30 about every 300 meters. Streamer positioning device 35 may include a sensor configured to determine the orientation of streamer portion 30A at the location of streamer positioning device 35. Streamer positioning device 35 may include hydrodynamic deflecting surfaces (e.g., "wings") that are configured to impart force on streamer portion 30A as it is towed. As such, streamer positioning device 35 may be operable to control a position of streamer portion 30A. Such control may be in the vertical (depth) direction and/or the horizontal (lateral) direction and/or the direction of twist about longitudinal axis 59.

Streamer positioning device 35 may also be operable to twist and untwist streamer portion 30A. In certain embodiments, streamer positioning device 35 may impart force upon streamer portion 30A causing it to rotate against a detected amount of twist. As streamer portion 30A is untwisted, particle motion sensors 50A and 50B may be rotated relative to one another and become aligned with one another along a particular axis. In some embodiments, this untwisting functionality may allow particle motion sensors 50A and 50B to become aligned with one another with a difference of orientation less than or equal to 1.5°.

Streamer positioning device 35 may in some embodiments be communicatively coupled to a control system on vessel 14. Such a control system may be included in recording system 12. The control system may monitor and control the forces imparted by each of streamer positioning devices 35. In some embodiments, the control system may maintain a model (e.g., a dynamic computer-based model) of position, orientation, and other data of each of the streamers including streamer 30. As such, the model may include an orientation of the particle motion sensors that are disposed within streamer 30. Based on the model, the control system may determine the forces that streamer positioning devices 35 should impart to adjust the position and/or rotational orientation of streamer 30.

In one embodiment, for example, an orientation of particle motion sensor group 500 along with data indicative of a position of streamer 30 may be included in the computer-based model. The control system may then update the orientation of particle motion sensor group 500 and position of streamer 30 in the model based on data from tilt sensor(s) and/or the forces that streamer positioning devices 35 impart on streamer 30.

In certain embodiments, the control system may include a module or circuitry configured to dynamically compensate the signals output from a particle motion sensor group based on the twist (e.g., relative movement/misalignment between particle motion sensors in a particle motion sensor group).

In some embodiments, an important impact of streamer twist is that a group of vector-based sensors (e.g., particle motion sensors) may show a reduced output due to the misalignment among the sensors in the group. In some embodiments, recording system 12 (or circuitry on the streamers themselves, such as the digitizing units) may compensate for the effects of twist. The reduction in signal due to sensor misalignment within a group may be mathematically compensated for. For example, consider the case where a streamer has a twist rate per unit length of θ(l). The analog output, y, of the particle motion sensor group may then be given by:

$$y = \sum_{l=-x}^{x} a_l \cos\left(\int_0^l \theta(z)dz\right)$$

In this equation, l denotes the position along the length of a particle motion sensor group that extends from −x to +x along the streamer axis, and the a's denote the ideal output of the individual sensor at position l (that is, the output that would be expected in the absence of any twist). The integral over the dummy variable z represents the amount of streamer twist at position l based on the twist rate θ, and the cosine indicates the amount by which each term is reduced due to the twist.

Under some circumstances (e.g., if the twist rate is relatively constant, or if the group length is relatively short), the sum given above may be well-approximated by assuming that θ is approximately constant over the group length. In this case, the equation above becomes:

$$y \cong \sum_{l=-x}^{x} a_l \cos(l\theta(l))$$

The twist-compensated output $y_{comp}$ (scaled to an equivalent single sensor output at l=0) can be approximated by using the inverse of the "geometrical factor" (that is, the sum of the cosines):

$$y_{comp} \cong y \cdot \frac{1}{\sum_{l=-x}^{x} \cos(l\theta(l))}$$

Figures 5, 6:
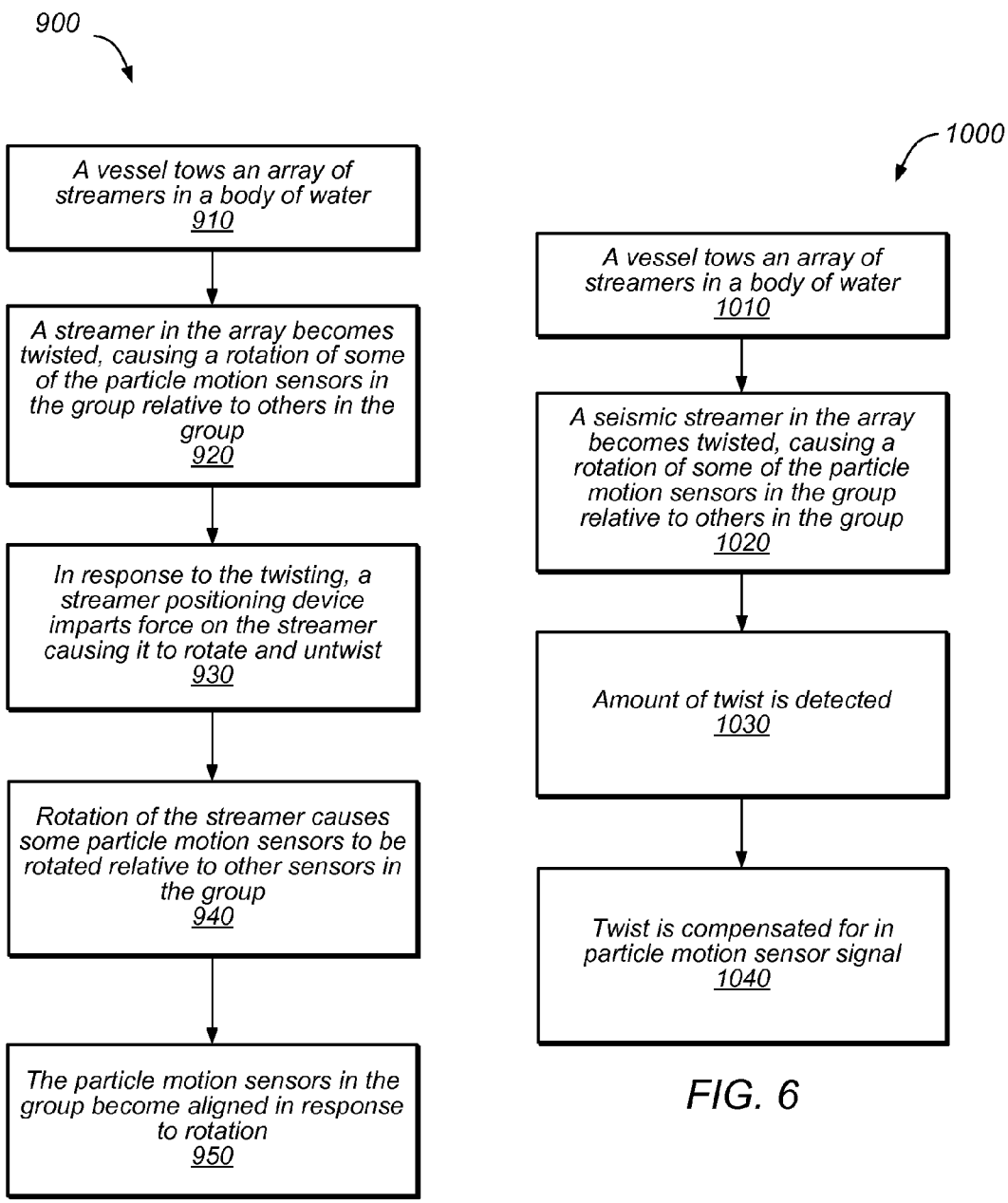
FIG. 5 illustrates a process flow according to one embodiment of the disclosure.
FIG. 6 illustrates a process flow according to a different embodiment of the disclosure.
Figure 7:
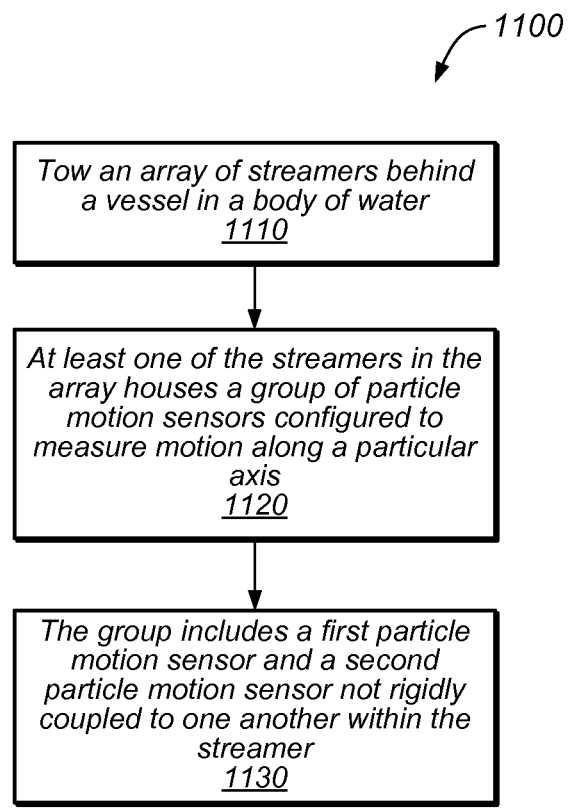
FIG. 7 illustrates a process flow according to a different embodiment of the disclosure.

Turning now to FIGS. 5-7, flow charts of various embodiments of methods according to this disclosure are shown. It should be understood that according to some embodiments, fewer than all steps of each method may be performed in accordance with this disclosure, and that in some embodiments the steps may be performed in a different order.

Turning now to FIG. 5, an embodiment of a method of operating a streamer according to this disclosure is shown. Process 900 starts at block 910. At block 910, a vessel tows an array of streamers in a body of water, and at least one of the streamers in the array includes a group of particle motion sensors that are not rigidly aligned to one another. Process 900 proceeds to block 920.

At block 920, the streamer becomes twisted, causing a rotation of some of the particle motion sensors in the group relative to others in the group. Process 900 proceeds to block 930.

At block 930, in response to the at least one streamer becoming twisted, a streamer positioning device imparts force on the streamer causing it to untwist by rotating against the twist. Process 900 proceeds to block 940.

At block 940, as the streamer rotates and untwists, some particle motion sensors in the group are rotated relative to others in the group. Process 900 proceeds to block 950.

At block 950, the particle motion sensors in the group become aligned (for example, they may become aligned along the vertical axis). Process 900 ends at block 950.

Turning now to FIG. 6, another embodiment of a method of operating a streamer according to this disclosure is shown. Process 1000 starts at block 1010. At block 1010, a vessel tows an array of streamers in a body of water, and at least one of the streamers in the array includes a group of particle motion sensors that are not rigidly aligned to one another. Process 1000 proceeds to block 1020.

At block 1020, the streamer becomes twisted, causing a rotation of some of the particle motion sensors in the group relative to others in the group. Process 1000 proceeds to block 1030.

At block 1030, the amount of twist (e.g., a twist orientation and/or a twist rate) is detected. For example, this may be detected via one or more twist sensors in the streamer. In some embodiments, a twist sensor may be formed from two (or more) tilt sensors separated by a selected distance along the length of the streamer. In some embodiments, the amount may be detected via other types of sensors, such as sensors operable to detect the direction of gravity and/or the earth's magnetic field. Process 1000 proceeds to block 1040.

At block 1040, the twist is mathematically compensated for. For example, this may be done via the equations described above or by other methods in various embodiments. Process 1000 ends at block 1040.

Turning now to FIG. 7, another embodiment of a method according to this disclosure is shown. Process 1100 starts at block 1110. At block 1110, an array of streamers is towed behind a vessel in a body of water. Process 1100 proceeds to block 1120.

At block 1120, it is noted that at least one of the streamers in the array houses a group of particle motion sensors configured to measure motion along a particular axis. Process 1100 proceeds to block 1130.

At block 1130, it is noted that the group includes a first particle motion sensor and a second particle motion sensor not rigidly coupled to one another. Process 1100 ends at block 1130.

According to some embodiments of this disclosure, the signal-to-noise ratio of particle motion sensors may be improved during a marine seismic survey operation. According to some embodiments, survey sensitivity may be increased, and/or inefficiencies related to streamer twisting may be reduced, and/or overall survey operation cost may be reduced.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various embodiments may provide some, all, or none of the described advantages. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 a streamer that includes a group of particle motion sensors, wherein each particle motion sensor in the group is configured to measure motion along a same particular axis, wherein the group of particle motion sensors includes a first particle motion sensor and a second particle motion sensor, wherein the streamer is configured to permit flexing that changes alignment of the first particle motion sensor relative to the second particle motion sensor;
 a digitizing unit configured to combine outputs of the particle motion sensors in the group in an analog manner and digitize the combined analog signal;
 one or more orientation sensors configured to determine a difference in alignment between the first particle motion sensor and the second particle motion sensor, wherein the difference is indicative of twisting of the streamer; and a compensation unit configured to compensate for the twisting of the streamer by processing outputs of the first and second particle motion sensors, based on the determined difference in alignment.

2. The apparatus of claim 1, wherein the first and second particle motion sensors are housed in respective bodies within the streamer, wherein the respective bodies are coupled to a strength member of the streamer.

3. The apparatus of claim 1, further comprising:
at least one strength member disposed within the streamer and along a length of the streamer; and
a plurality of bodies coupled to the at least one strength member, wherein a first body of the plurality of bodies includes the first particle motion sensor, and wherein the first particle motion sensor is rigidly disposed in the first body.

4. The apparatus of claim 3, wherein a second body of the plurality of bodies is disposed apart from the first body by a selected distance along the strength member.

5. The apparatus of claim 1, wherein the streamer further includes a second group of particle motion sensors configured to measure motion along a different axis, wherein the second group of particle motion sensors includes a third and a fourth particle motion sensor that are movable relative to one another within the streamer.

6. The apparatus of claim 1, further comprising:
a streamer positioning device that is configured to cause, by rotating a portion of the streamer around a longitudinal axis thereof, a reduction in the difference in alignment between the first particle motion sensor and the second particle motion sensor, based on the output of the one or more orientation sensors.

7. A method, comprising:
towing an array of streamers behind a vessel in a body of water, wherein at least one of the streamers in the array houses a group of particle motion sensors, wherein each particle motion sensor in the group is configured to measure motion along a same particular axis; and
combining respective outputs of the particle motion sensors in the group in an analog manner, wherein the group includes a first particle motion sensor and a second particle motion sensor and wherein flexing of the streamer during operation of the sensors in a seismic survey results in change in relative alignment of the first particle motion sensor and the second particle motion sensor;
determining, by one or more orientation sensors, a difference in alignment of the first particle motion sensor relative to the second particle motion sensor; and
compensating for a twisting of the streamer by processing outputs of the first and second particle motion sensors, based on the determined difference in alignment.

8. The method of claim 7, further comprising:
in response to a determination of misalignment of the first particle motion sensor relative to the second particle motion sensor, updating a model of an orientation of the first particle motion sensor.

9. The method of claim 7, further comprising:
in response to the at least one streamer becoming twisted, controlling a streamer positioning device such that the streamer positioning device causes the first particle motion sensor to be rotated relative to the second particle motion sensor, wherein the controlling includes untwisting the at least one streamer such that the first particle motion sensor is aligned with the second particle motion sensor along the particular axis.

10. The method of claim 7, further comprising producing a geophysical data product based on signals from the group of particle motion sensors.

11. The method of claim 10, further comprising importing the geophysical data product onshore.

12. The method of claim 11, further comprising performing geophysical analysis onshore on the geophysical data product.

13. An apparatus, comprising:
a streamer that includes a group of particle motion sensors configured to measure motion along a same particular axis, wherein the particle motion sensors in the group are configured such that their respective outputs are combined in an analog manner, wherein the group of particle motion sensors includes first and second particle motion sensors that are rigidly fixed to the streamer, and wherein the streamer is configured to permit flexing that changes relative rotation of the first and second particle motion sensors;
one or more orientation sensors configured to determine and output alignment information that indicates a difference in alignment between the first particle motion sensor and the second particle motion sensor; and
a compensation unit configured to compensate for a twisting of the streamer by processing outputs of the first and second particle motion sensors, based on the determined difference in alignment.

14. The apparatus of claim 13, wherein:
the streamer further includes a plurality of pressure sensors configured to transmit signals indicative of pressure variations.

15. The apparatus of claim 13, wherein the streamer further includes a second group of particle motion sensors that are configured to transmit signals indicative of motion along a second axis, wherein the second axis is orthogonal to the particular axis.

16. The apparatus of claim 13, wherein the one or more orientation sensors are two tilt sensors.

17. The apparatus of claim 16, wherein the one or more orientation sensors include an accelerometer.

18. The apparatus of claim 13, further comprising:
a strength member disposed within the streamer along a length thereof, wherein the strength member is coupled to a first and a second spacer, wherein the first spacer includes the first particle motion sensor, and wherein the second spacer includes the second particle motion sensor.

* * * * *